US012567276B2

(12) United States Patent
Tang et al.

(10) Patent No.: US 12,567,276 B2
(45) Date of Patent: Mar. 3, 2026

(54) METHOD AND APPARATUS FOR DOCUMENT ANALYSIS THROUGH LAYER SEPARATION BY MACHINE LEARNING WITH CROSS-LAYER REASONING

(71) Applicant: Hong Kong Applied Science and Technology Research Institute Company Limited, Hong Kong (HK)

(72) Inventors: Wai Kai Arvin Tang, Hong Kong (HK); Ping Yin Koon, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 334 days.

(21) Appl. No.: 18/459,460

(22) Filed: Sep. 1, 2023

(65) Prior Publication Data
US 2025/0078557 A1    Mar. 6, 2025

(51) Int. Cl.
| | |
|---|---|
| *G06V 30/416* | (2022.01) |
| *G06V 10/774* | (2022.01) |
| *G06V 30/22* | (2022.01) |
| *G06V 30/413* | (2022.01) |

(52) U.S. Cl.
CPC .......... *G06V 30/416* (2022.01); *G06V 10/774* (2022.01); *G06V 30/22* (2022.01); *G06V 30/413* (2022.01); *G06V 2201/09* (2022.01)

(58) Field of Classification Search
None
See application file for complete search history.

(56) References Cited

U.S. PATENT DOCUMENTS

| | | |
|---|---|---|
| 6,411,733 B1 | 6/2002 | Saund |
| 7,616,813 B2 | 11/2009 | Nishida |
| 9,384,423 B2 | 7/2016 | Rodriguez-Serrano et al. |
| 10,540,579 B2 | 1/2020 | Reisswig et al. |

(Continued)

FOREIGN PATENT DOCUMENTS

| | | |
|---|---|---|
| CN | 114998905 A | 9/2022 |
| WO | 2023034125 A1 | 3/2023 |

OTHER PUBLICATIONS

International Search Report and Written Opinion of corresponding PCT application No. PCT/CN2023/124523 mailed on May 8, 2024.

*Primary Examiner* — Andrew H Lam
(74) *Attorney, Agent, or Firm* — Idea Intellectual Limited; Sam T. Yip

(57) ABSTRACT

A method for processing electronic documents, comprising: receiving an electronic document; recognizing one or more content components in the electronic document; identifying a content type for each of the recognized content components; creating, by a layer separator, one or more logical layers from the recognized content components such that each of the logical layer contains only the content components of the same content type; and invoking a content-type specific content handler for each of the logical layers created. The layer separator comprises a machine learning (ML) model based on a modified U-Net convolutional neural network and trained to classify the content types of the content components. The modified U-Net CNN is improved over traditional U-Net CNN with transformers at each layer to achieve high recovery rate.

18 Claims, 8 Drawing Sheets

(56) References Cited

U.S. PATENT DOCUMENTS

| | | | |
|---|---|---|---|
| 2006/0204095 A1 | 9/2006 | Nishida | |
| 2009/0148039 A1 | 6/2009 | Chen et al. | |
| 2011/0255789 A1 | 10/2011 | Neogi et al. | |
| 2019/0147103 A1* | 5/2019 | Bhowan | G06V 10/454 |
| | | | 707/737 |
| 2021/0034855 A1 | 2/2021 | Shorter et al. | |
| 2021/0117666 A1* | 4/2021 | Kaynig-Fittkau | G06N 3/0464 |

* cited by examiner

METHOD AND APPARATUS FOR DOCUMENT ANALYSIS THROUGH LAYER SEPARATION BY MACHINE LEARNING WITH CROSS-LAYER REASONING

FIELD OF THE INVENTION

The present invention generally relates to the field of automated document processing. More specifically the present invention relates to methods and apparatuses of analyzing complex documents having textual and non-textual elements using machine learning techniques.

BACKGROUND OF THE INVENTION

Optical Character Recognition (OCR) has made significant impact in the document processing and automation field. However, in practice, difficulties still exist in document processing automation. Other than texts, a document may contain tables, logos, charts and graphs, graphics, company chop stamps, and other structured and non-structured elements. To document processing automation, this presents two problems: the non-textual contents may hinder the OCR accuracy; and the non-textual contents may also contain important information, which required to be extracted. Take the document presented in FIG. 1 as an example. The document contains a graphical logo of "Test Bank", a chop stamp by the bank teller with a date, a barcode, a table with textual content, some printed text that includes the customer's name and address in the top left portion, and a handwritten signature. Under a traditional OCR operation, due to the chop stamp being overlapping the customer's name and address, the recognized customer's address may incorrectly include "Test Bank" and the date of the chop stamp (i.e., "10, Castel Street, Test Bank, Yuen Long, 10 Nov. 2020"). Further, information presented by the chop stamp as well as other non-textual content components may not be captured at all.

U.S. Patent Application Publication No. 2009/0148039A1 disclosed a method of generating a multi-layered document representation for classifying content components of a document. This method, however, operates on document images based on color segmentation, and hence would not work on black and white documents or documents without sufficient color information.

U.S. Pat. No. 7,616,813B2 disclosed a method of processing a document by segmenting the document into different text regions and extracting a white background of the document. Obviously, such method may not work with documents having different background colors or mixed multiple colors in the background.

SUMMARY OF THE INVENTION

It is an objective of the present invention to address the aforementioned shortcomings in the state of the art by providing an apparatus and a method for processing electronic documents, such as a digitized optical scan of a physical paper document, that separate the content components of an electronic document into a plurality of logical layers, each of one content type, such that a specific content handling process may be applied to each of the logical layers according to its content type.

In accordance with a first aspect of the present invention, an electronic document processing system is provided. The electronic document processing system comprises a layer separator, one or more content-type specific content handlers, and a multi-layer cross-referencing handler.

In accordance with a second aspect of the present invention, the electronic document is input to the machine learning (ML)-based layer separator to logically separate the contents of the electronic document into different layers based on the different content types. The results of the separation are one or more logical layers created, wherein each of the logical layers contains one or more content components of the same content type. In accordance with one embodiment, the content types comprise printed text content type, handwritten text content type, chop stamp content type, structured content type, barcode content type, and complex content type. The separation of the contents of the electronic document is then based on these six content types. Other content types are also possible by training the ML-based layer separator accordingly.

In accordance with a third aspect of the present invention, with the logical layers created by the layer separator, a content handler specific to a content type is applied to process each of the logical layers according to its content type.

A printed text content handler is applied to process the layer of printed text content type. The printed text content handler is configured to extract one or more regions of interest (ROIs) containing the actual printed texts for further processing and disregarding empty background space. Depending on the language model of the printed text content handler, the printed text content handler may segment the ROIs into sentences or characters, or feed the ROIs as-is directly to an OCR engine for text recognition.

A handwritten text content handler is applied to process the layer of handwritten text content type. The handwritten text content handler is configured to extract one or more ROIs containing the actual handwritten text and/or signatures for further processing and disregarding empty background space. The handwritten text content handler feeds the ROIs containing handwritten text as-is directly to an OCR engine for text recognition. The handwritten text content handler feeds the ROIs containing signatures to a signature verification engine for signature verification.

A chop stamp content handler is applied to process the layer of chop stamp content type. The chop stamp content handler comprises a shape detector configured to localize the outline shapes of one or more chop stamps in the layer of chop stamp content type to generate a chop stamp image for each of the chop stamps. The chop stamp content handler further comprises a text detector configured to detect, recognize, and extract the text from each of the chop stamp images. Each of the chop stamp image and the corresponding extracted text pairs is then used to compare and verify with records of chop stamp images previously stored in a chop stamp database connected to the chop stamp content handler.

A structured content handler is applied to process the layer of structured content type. The structured content handler is configured to detect, recognize, and extract one or more structured content components in the layer of structured content type using shape analysis.

A barcode content handler is applied to process the layer of barcode content type. The barcode content handler is configured to detect, recognize, and extract barcode content components in the layer of barcode content type for decoding into machine readable data, wherein the barcode content components may be barcodes and/or QR codes.

A complex content handler is applied to process the layer of complex content type. As the layer of complex content type may contain one or more of logos, arbitrarily shaped objects, and other non-textual content components, the complex content handler comprises one or more of logo detector and other context-sensitive content handling sub-modules for detecting, recognizing, and extracting these complex content components of various complex content sub-types. The logo detector is configured to detect, recognize, and extract logos in the layer of complex content type. Each of the extracted logos is then used to compare and verify with records of logo images previously stored in a logo database connected to the complex content handler.

In accordance with a fourth aspect of the present invention, the multi-layer cross-referencing handler is configured to perform context-sensitive cross referencing two or more content components extracted from layers of different content types, that is each of the content components extracted to be cross-referenced belongs to a layer of content type different from the other content components extracted to be cross-referenced. The context-sensitive cross referencing analyzes the locations (in the page of the electronic document), content types, sub-types, and attributes of the content components extracted to be cross-referenced and determine their context significance.

BRIEF DESCRIPTION OF THE DRAWINGS

Embodiments of the invention are described in more details hereinafter with reference to the drawings, in which.

DETAILED DESCRIPTION

In the following description, apparatuses, systems, and methods of electronic document processing and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
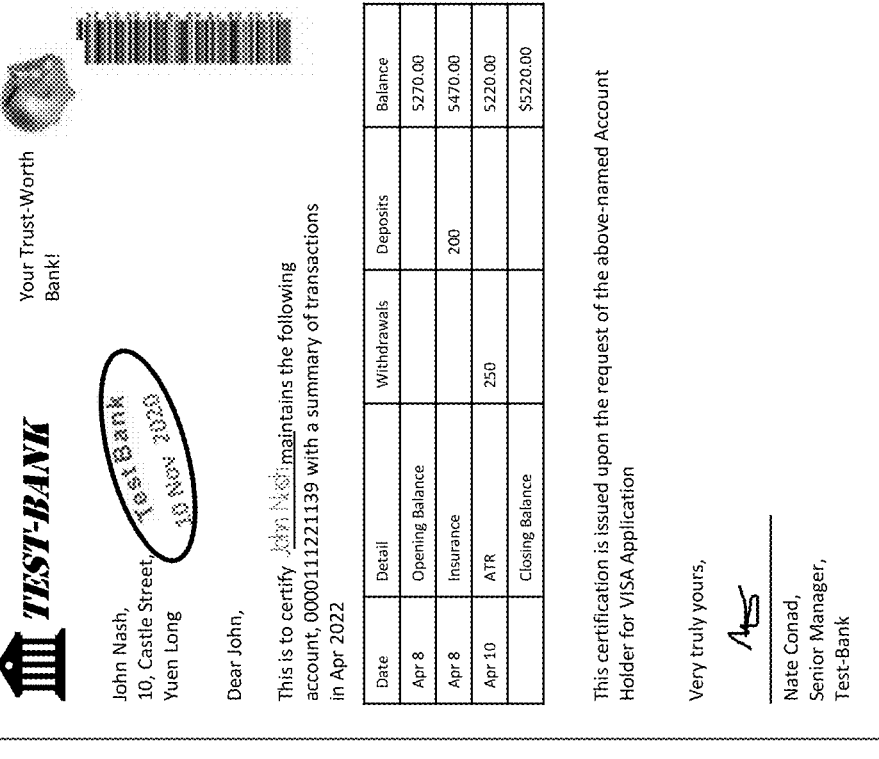
FIG. 1 depicts an exemplary document containing a plurality of content components of different content types.
Figure 2A:
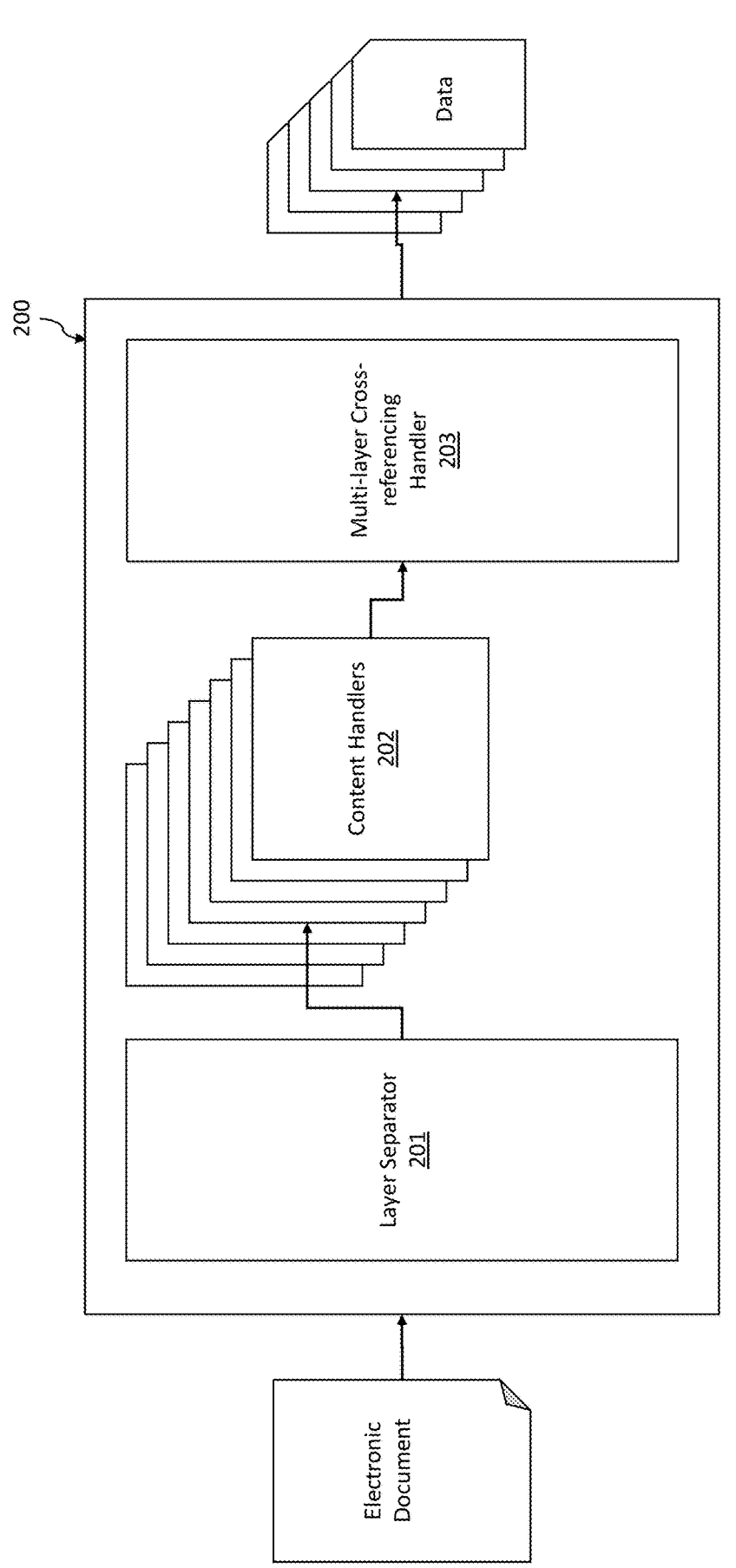
FIG. 2A depicts a logical block diagram of an electronic document processing system in accordance to various embodiments of the present invention.
Figure 2B:
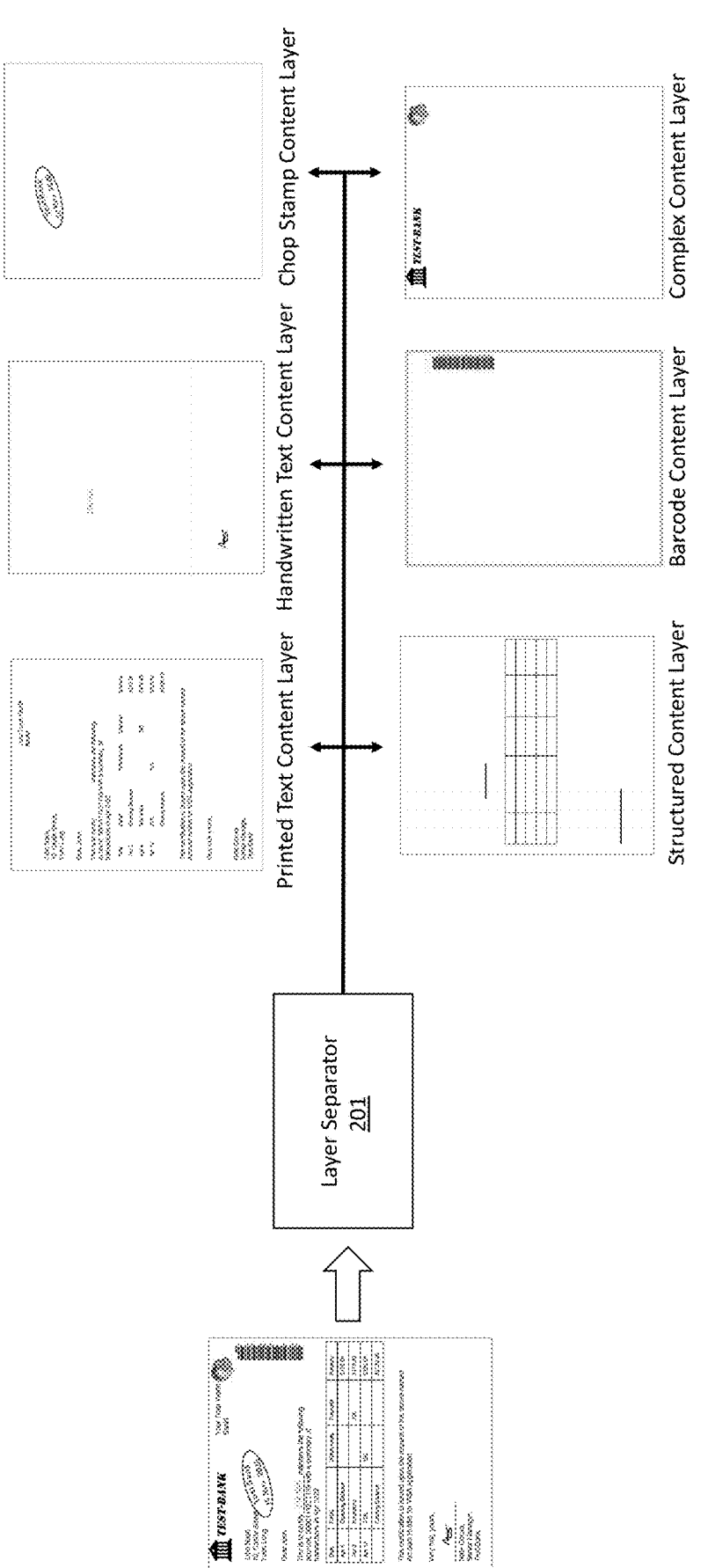
FIG. 2B illustrates the layer separation operation by a layer separator of the electronic document processing system.

Referring to FIGS. 2A and 2B for the following description. In accordance with a first aspect of the present invention, an electronic document processing system 200 is provided. The electronic document processing system 200 for recognizing the contents of an electronic document comprises a number of logical data processing modules. These logical data process modules comprise a ML-based layer separator 201, one or more content-type specific content handlers 202, and a multi-layer cross-referencing handler 203.

In accordance with a second aspect of the present invention, the electronic document is input to the layer separator 201 to logically separate the content components of the electronic document into different layers based on their content types. The results of the separation are one or more logical layers created, wherein each of the logical layers contains one or more of the content components of the same content type. In accordance with one embodiment, the content types comprise printed text content type, handwritten text content type, chop stamp content type, structured content type, barcode content type, and complex content type. The separation of the contents of the electronic document is then based on these six content types.

An ordinarily skilled person in the art, however, will appreciate other content types are possible by training the ML-based layer separator 201 according to the different content types. For example, textual contents of particular languages, font styles or sizes; graphical contents of particular colors, surface textures, object shapes or sizes; structured contents of particular table, list, chart, or graph formats can be used as basis for layer separation; and the embodiments of the present invention are readily adaptable to process an electronic document as such.

Figure 3:
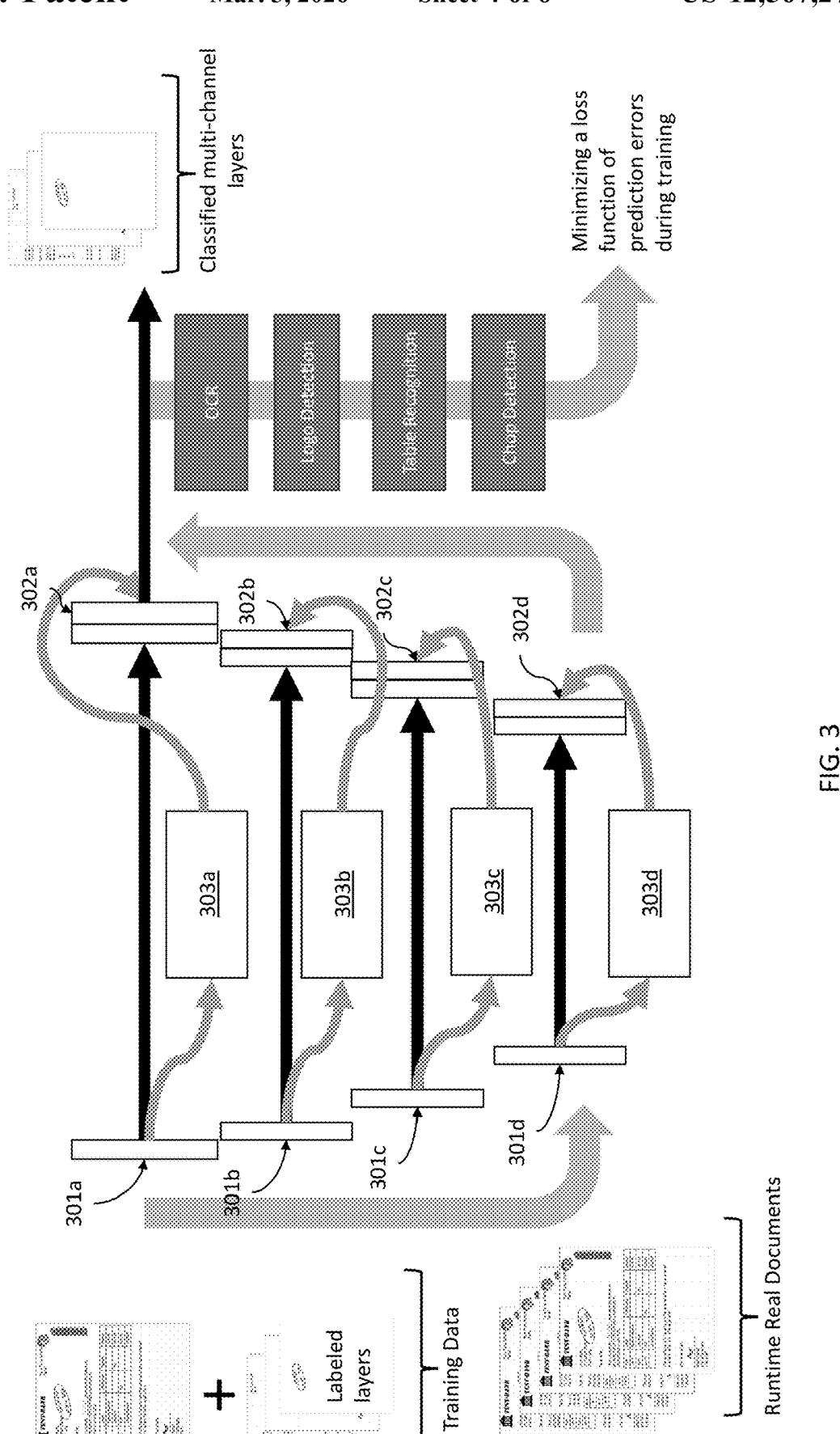
FIG. 3 depicts a logical dataflow diagram of a ML model of the layer separator of the electronic document processing system for generating separate logical layers of content components of different content types in accordance to one embodiment of the present invention.

Referring to FIG. 3 for the following description. The layer separator 201 comprises a ML model 300 that learns to classify the logical layers of the electronic document containing the content components of the various content types. In one embodiment, the ML model 300 is based on a modified U-Net convolutional neural network. The modified U-Net convolutional neural network has a multi-layered architecture having a contracting path 301 and an expansive path 302 through the layers. The modified U-Net convolutional neural network takes an image of the electronic document as its initial input with the logical dataflow follows the contracting path down through the layers and the expansive path up through the layers.

In the contracting path 301, repeated applications of convolution, each followed by an activation function and a pooling operation are performed at each layer. During the contraction, the spatial information is reduced while feature information is increased. The expansive pathway combines the feature and spatial information through, at each layer, an up-convolution, and a concatenation of the feature map with a transformed feature map generated in the contracting path at the corresponding layer.

In the contracting path 301, each layer has an encoder (301a, 301b, 301c, or 301d) for down-sampling (which comprises an application of convolution, followed by an activation function and a pooling operation) a feature map generated for the image of the input electronic document, then that resolution of the feature map is reduced by half as the feature map is down-sampled at each layer downward. For example, the encoder 301a takes the input electronic document and generate a first feature map, the first feature map is then down-sampled by the encoder 301*b* to generate a second feature map, the second feature map is then down-sampled by the encoder 301*c* to generate a third feature map, the third feature map is then down-sampled by the encoder 301*d* to generate a fourth feature map. On the other hand, the number of feature channels is doubled at each layer in the contracting path. Thus, during contraction, the spatial information is reduced while feature information is increased.

In the expanding path 302, each layer has a decoder (302*a*, 302*b*, 302*c*, or 302*d*) for up-sampling (which comprises an application of up-convolution, followed by an activation function) a concatenation of the feature map and a transformed feature map generated in the contracting path 301 at the corresponding layer. Thus, during expansion, the spatial information is increased while feature information is reduced. The transformed feature map is generated by a transformer (303*a*, 303*b*, 303*c*, or 303*d*) at the corresponding layer transforming the corresponding feature map with attentions on specific features.

In accordance with a preferred embodiment, the modified U-Net convolutional neural network comprises four layers of encoder-decoder. An ordinarily skilled person in the art would appreciate that layer separators implemented with modified U-Net convolutional neural networks of different numbers of layers are readily realizable. With lesser number of layers in the modified U-Net convolutional neural network, however, while the speed performance might increase, the accuracy in the separation of the content components of different content types might suffer. On the other hand, with higher number of layers in the modified U-Net convolutional neural network, the increase in accuracy in the separation of the content components of different content types might diminish while the computational resource consumption might increase significantly.

Figure 4:
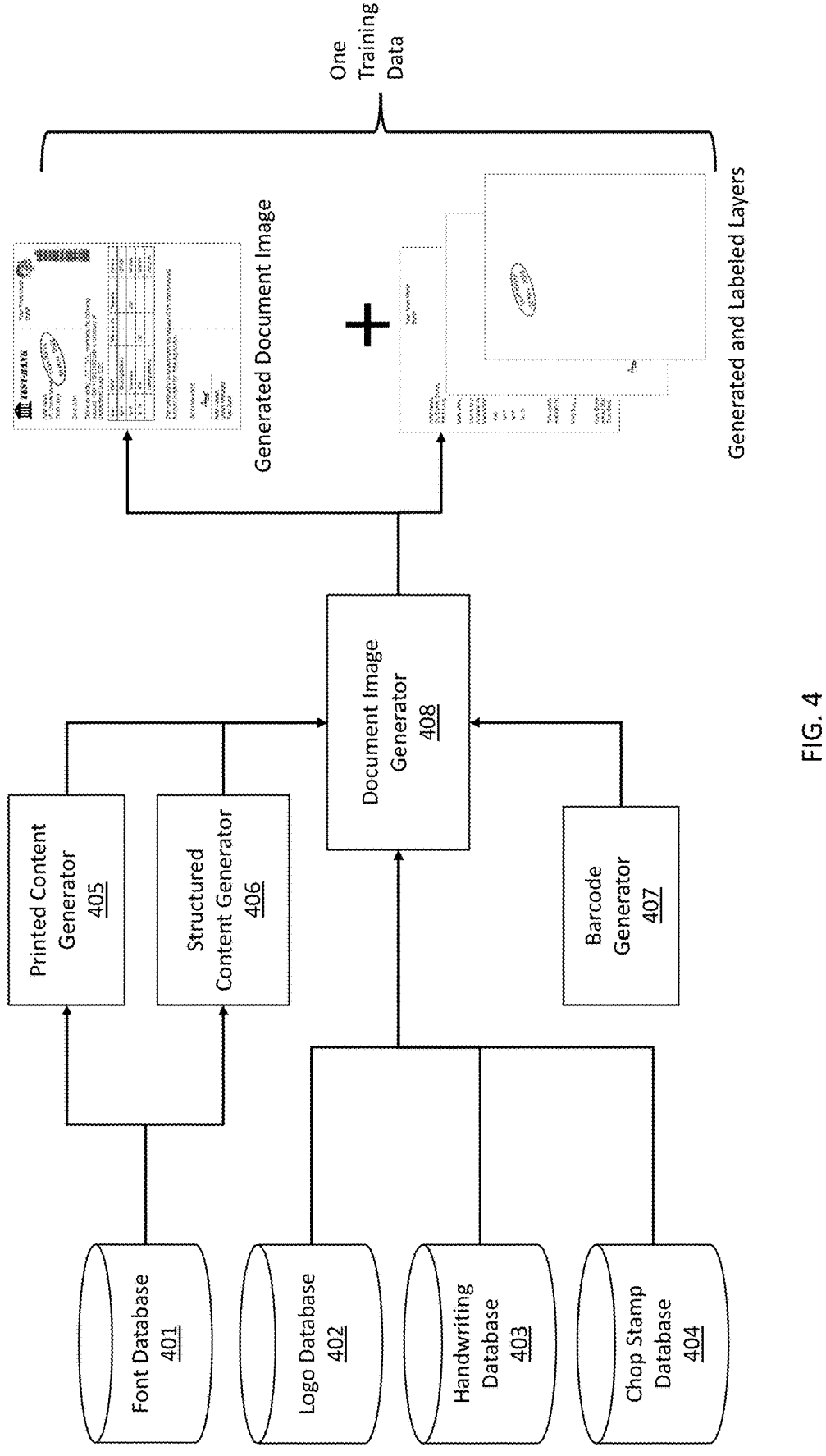
FIG. 4 depicts a logical dataflow diagram of artificial training data generation for training the ML model of the layer separator.

Referring to FIG. 4 for the following description. In accordance with one embodiment, the ML-based layer separator 201 is trained using training data generated by a printed content generator 405, structured content generator 406, barcode generator 407, and a document image generator 408. The training data comprises a plurality of pairs of generated document image and the images of the correspondingly labelled logical layers of content components of the various content types that compose the generated document image.

The printed content generator 405 is configured to generate printed texts of specific languages, various typefaces, font sizes, and colors with input of sample texts of the specific language and various typefaces obtained from a font database 401. The structured content generator 406 is configured to generate structured content components, including tables containing data of specific languages, various typefaces, font sizes, and colors with input of sample texts of the specific language and various typefaces obtained from the font database 401. The document image generator 408 is configured to generate an image of document and its correspondingly labelled logical layers of content components of the various content types that compose each of the generated document images from the output of the printed content generator 405 and the output of the structured content generator 406. The document image generator 408 is further configured to add one or more logos as complex content components to the image of document using sample logos retrieved from a logo database 402; add one or more handwritten content components to the image of document using sample handwritings retrieved from a handwriting database 403; and add one or more chop stamp content components to the image of document using sample chop stamps retrieved from a chop stamp database 404. Lastly, the document image generator 408 is further configured to add one or more barcode content components to the image of document using the output of the barcode generator 407. The pairs of generated document image and the images of the correspondingly labelled logical layers of content components of the various content types are then used to train the layer separator 201 until a minimum of a loss function of prediction errors in the layer separator 201 classifying the logical layers of the generated document images is found.

In accordance with a third aspect of the present invention, with the logical layers created by the layer separator 201, a content handler specific to a content type is applied to process each of the logical layers according to its content type.

In one embodiment, a printed text content handler is applied to process the layer of printed text content type. The printed text content handler is configured to extract one or more regions of interest (ROIs) containing the actual printed text for further processing and disregard empty background space. Depending on a language model chosen for printed text content handler, the printed text content handler may segment the ROIs into sentences and/or characters before feeding to an OCR engine, or feed the ROIs as-is directly to the OCR engine for text recognition. The printed text content handler is configured to recognize the printed text, extract their attributes and locations on the page of the electronic document, wherein the attributes comprise the typeface, font size, and color of the text, and the author identification.

Figure 5:
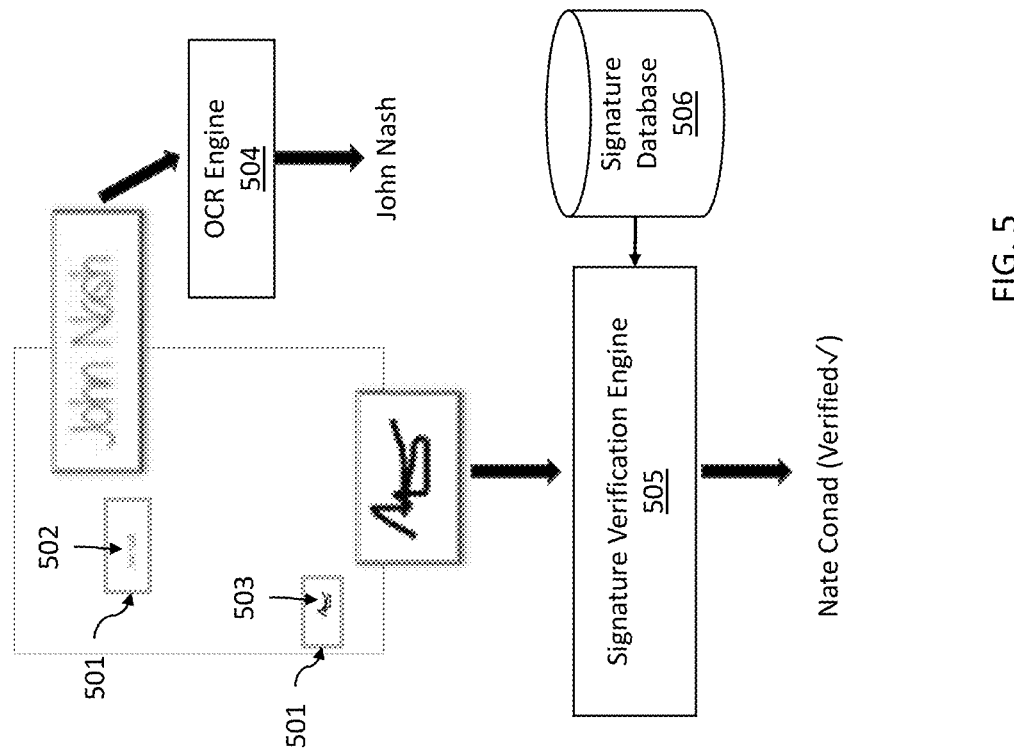
FIG. 5 depicts logical block diagram of a handwritten text content handler of the electronic document processing system in accordance to one embodiment of the present invention.

Referring to FIG. 5 for the following description. In one embodiment, a handwritten text content handler is applied to process the layer of handwritten text content type. The handwritten text content handler is configured to extract one or more ROIs 501 containing the actual handwritten texts 502 and/or signatures 503 for further recognition as handwritten text or signature, and disregard empty background space. The handwritten text content handler feeds the ROIs 501 containing handwritten text as-is directly to an OCR engine 504 for text recognition. The handwritten text content handler is configured to recognize the handwritten text, their attributes and locations on the page of the electronic document, wherein the attributes comprise the writer identification. The handwritten text content handler feeds the ROIs containing signatures to a signature verification engine 505 having a pretrained model for signature verification. The model for signature verification comprises a signature database 506 storing records of authentic signature. Using the model for signature verification, the signature verification engine 505 determines the authenticities and signers of the signatures in the ROIs by comparing to the records of authentic signatures.

Figure 6:
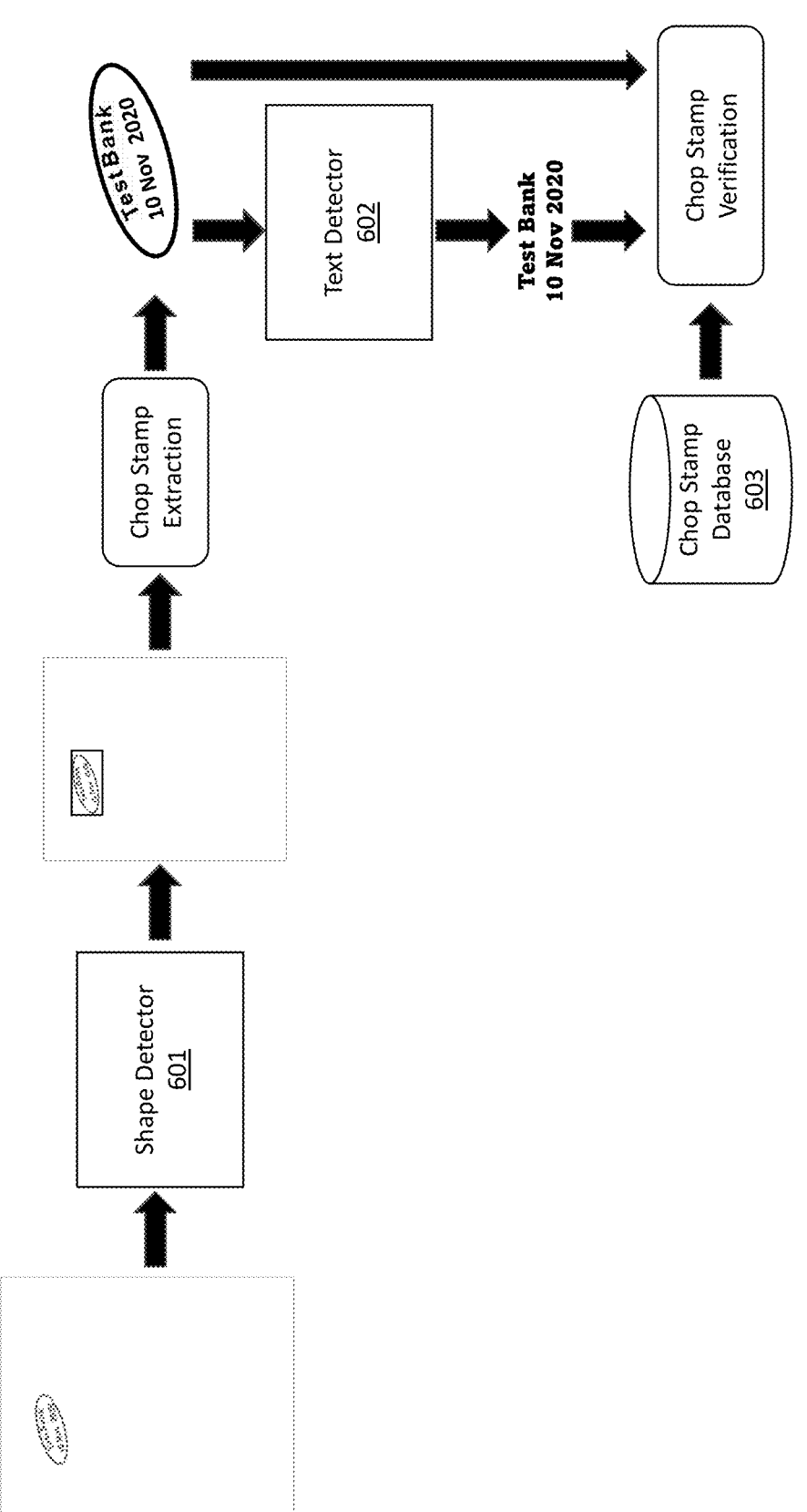
FIG. 6 depicts logical block diagram of a chop stamp content handler of the electronic document processing system in accordance to one embodiment of the present invention.

Referring to FIG. 6 for the following description. In one embodiment, a chop stamp content handler is applied to process the layer of chop stamp content type. The chop stamp content handler comprises a shape detector 601 configured to localize the outline shapes of one or more chop stamps in the logical layer of chop stamp content type. According to the localized outline shapes of the chop stamps, the chop stamp content handler crops each of the image regions containing the chop stamps to obtain the individual chop stamp images. The chop stamp content handler further comprises a text detector 602 configured to detect, recognize, and extract the text from each of the chop stamp images. Each of the chop stamp image and the corresponding extracted text pairs is then used to compare and verify with records of chop stamp images previously stored in a chop stamp database 603 connected to the chop stamp content handler.

In one embodiment, a structured content handler is applied to process the layer of structured content type. The structured content handler is configured to detect, recognize, and extract one or more structured content components in the layer of structured content type using structure and shape analysis. The structure and shape analysis may indicate that the extract structured content component is one of sub-types comprising a table, a list, an underlining, a highlighting, a box, and an artifact of a non-arbitrary shape. The results of the structure and shape analysis on each of the extracted structured content component are attached as its sub-type attribute.

In one embodiment, a barcode content handler is applied to process the layer of barcode content type. The barcode content handler is configured to detect, recognize, and extract one or more barcode content components in the layer of barcode content type, wherein the barcode content components may be barcodes and/or QR codes. The barcode content handler further comprises a barcode decoder for decoding each of the extracted barcode into machine readable data, which can be input to further processing depending on the different use case scenario.

Figure 7:
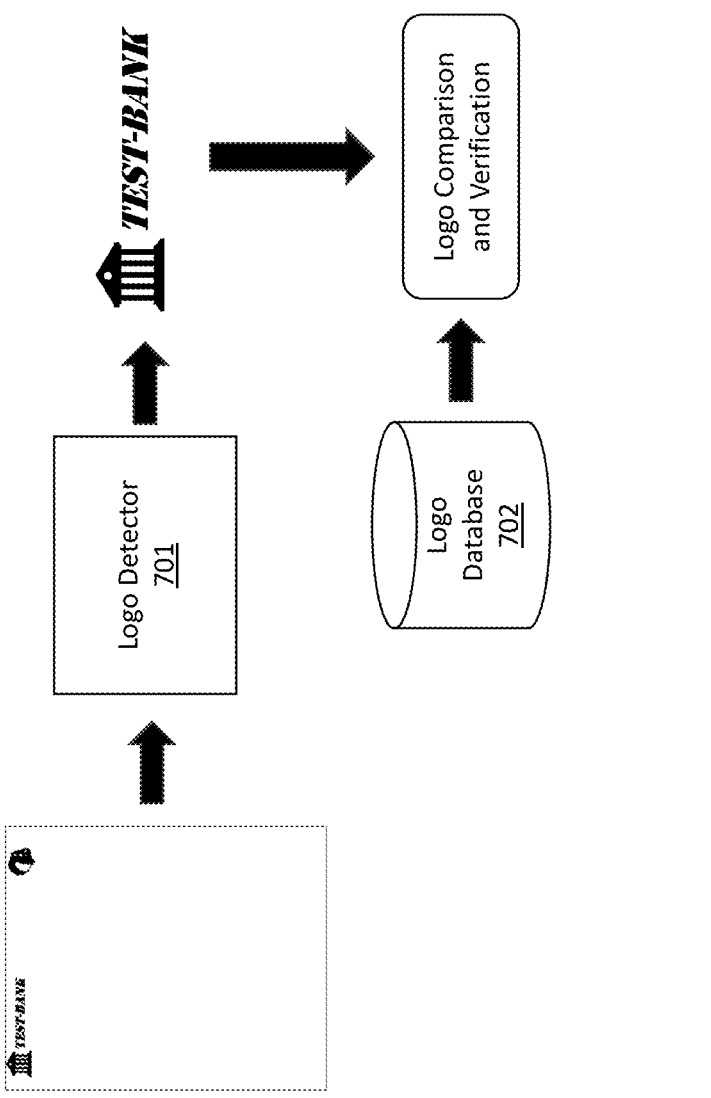
FIG. 7 depicts logical block diagram of a complex content handler of the electronic document processing system in accordance to one embodiment of the present invention.

Referring to FIG. 7 for the following description. In one embodiment, a complex content handler is applied to process the layer of complex content type. As the layer of complex content type may contain one or more of logos, arbitrarily shaped objects, and other non-textual content components, the complex content handler comprises one or more of logo detector 701 and other context-sensitive content handling sub-modules for detecting, recognizing, and extracting these complex content components of various complex content sub-types. The complex content handler is to first detect and recognize the complex content sub-type of each of the complex content components, then invoke to the corresponding context-sensitive content handling sub-module for each of them according to its complex content sub-type. The logo detector 701 is configured to detect, recognize, and extract logos in the layer of complex content type. Each of the extracted logos is then used to compare and verify with records of logo images previously stored in a logo database 702 connected to the complex content handler.

In accordance with a fourth aspect of the present invention, the multi-layer cross-referencing handler is configured to perform context-sensitive cross referencing of two or more content components extracted from layers of different content types, that is each of the content components extracted to be cross-referenced belongs to a layer of content type different from the other content components extracted to be cross-referenced. The context-sensitive cross referencing analyzes the locations (in the page of the electronic document), content types, sub-types, and attributes of the content components to be cross-referenced to determine the relationship between the content components; and determines a context significance from the determined relationship.

For example, a structured content component of underlining sub-type located immediately below a handwritten content component implies that the electronic document may be a standard form and the handwritten content component is one of user input by a respondent to the standard form. This provides additional attribute to the handwritten content component and a contextual meaning to the electronic document being processed.

For another example, a structured content component of table sub-type located in a region in the page of the electronic document that coincides with a number of printed text content components arranged in a grid located in the same region implies a table of data or text that is to be processed accordingly.

The functional units and modules of the apparatuses, systems, and methods of electronic document processing in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method for processing electronic documents, comprising:

receiving an electronic document;

recognizing one or more content components in the electronic document;

identifying a content type for each of the recognized content components; and creating, by a layer separator, one or more logical layers from the recognized content components such that each of the logical layer contains only the content components of the same content type;

wherein the layer separator comprises a machine learning (ML) model based on a modified U-Net convolutional neural network and trained to classify the content types of the content components;

wherein the modified U-Net convolutional neural network comprises four layers of encoders-decoders;

wherein each encoder is configured to down-sample a feature map through convolution, activation, and pooling operations such that, during contraction, spatial information is reduced while feature information is increased, wherein each decoder is configured to up-sample a feature map through up-convolution and activation operations such that, during expansion, spatial information is increased while feature information is reduced; and wherein the ML model is trained using training data comprising a plurality of pairs of a generated document image and correspondingly labelled logical layers of content components of various content types that compose the generated document image, such that encoder and decoder operations using the four layers of encoders-decoders are learned by the ML model through the training, and that the feature map transformations performed during contraction and expansion correspond to labeled logical layers used in the training.

2. The method of claim 1, therein the content types comprise printed text content type, handwritten text content type, chop stamp content type, structured content type, barcode content type, and complex content type.

3. The method of claim 1, further comprising:

extracting, by a printed text content handler, a region of interest (ROI) containing printed text for each of the content components of printed content type for further processing and disregard empty background space in the logical layer of printed text content type;

depending on a language model chosen for printed text content handler, segmenting the ROI into one or more of sentences and characters;

feeding the ROI as-is or the one or more of sentences and characters to an Optical Character Recognition (OCR) engine for performing a text recognition for the content component of printed text content type;

extracting one or more attributes and a location on the electronic document page of the content component of printed text content type, wherein the attributes comprise at least typeface, font size, and color of the text, and author identification.

4. The method of claim 1, further comprising:

extracting, by a handwritten text content handler, a ROI containing handwritten text or signature for each of the content components of handwritten text content type for further recognition as handwritten text or signature, and disregarding empty background space in the logical layer of handwritten text content type;

if the ROI contains handwritten text, feeding the ROI as-is to an OCR engine for performing a text recognition for the content component of handwritten text content type; and if the ROI contains signature, feeding the ROI as-is to a signature verification engine for performing a signature verification comprising comparing the signature to records of authentic signatures stored in a signature database.

5. The method of claim 1, further comprising:

localizing, by a chop stamp content handler, an outline shape of a chop stamp content component in the logical layer of chop stamp content type;

cropping an image region of the outline shape of the chop stamp content component to obtain an chop stamp image;

performing a text recognition of the chop stamp image to extract a text from the chop stamp image; and comparing and verifying the chop stamp image and the extracted text with records of chop stamp images stored in a chop stamp database.

6. The method of claim 1, further comprising:

detecting, recognizing, and extracting, by a structured content handler, one or more structured content components in the logical layer of structured content type using structure and shape analysis; and detecting a sub-type of each of the extracted structured content components, wherein the sub-types comprising a table, a list, an underlining, a highlighting, a box, and an artifact of a non-arbitrary shape.

7. The method of claim 1, further comprising:

detecting, recognizing, and extracting, by a barcode content handler, one or more barcode content components in the logical layer of barcode content type; and decoding each of the extracted barcode content components into machine readable data.

8. The method of claim 1, further comprising:

detecting, recognizing, and extracting, by a complex content handler, one or more complex content components in the logical layer of complex content type;

detecting a sub-type of each of the extracted complex content components; and invoking a context-sensitive content handling sub-module for each of the extracted complex content component according to its complex content sub-type.

9. The method of claim 1, further comprising:

performing, by a multi-layer cross-referencing handler, context-sensitive cross referencing of two or more content components extracted from logical layers of different content types, comprising:

analyzing locations, content types, sub-types, and attributes of the content components to be cross-referenced to determine the relationship between the content components; and determining a context significance from the determined relationship.

10. An apparatus for processing electronic documents, comprising:

a layer separator configured to:

receive an electronic document;

recognize one or more content components in the electronic document;

identify a content type for each of the recognized content components; and create one or more logical layers from the recognized content components such that each of the logical layer contains only the content components of the same content type;

wherein the layer separator comprises a machine learning (ML) model based on a modified U-Net convolutional neural network and trained to classify the content types of the content components;

wherein the modified U-Net convolutional neural network comprises four layers of encoders-decoders;

wherein each encoder is configured to down-sample a feature map through convolution, activation, and pooling operations such that, during contraction, spatial information is reduced while feature information is increased, wherein each decoder is configured to up-sample a feature map through up-convolution and activation operations such that, during expansion, spatial information is increased while feature information is reduced; and wherein the ML model is trained using training data comprising a plurality of pairs of a generated document image and correspondingly labelled logical layers of content components of various content types that compose the generated document image, such that encoder and decoder operations using the four layers of encoders-decoders are learned by the ML model through the training, and that the feature map transformations performed during contraction and expansion correspond to labeled logical layers used in the training.

11. The apparatus of claim 10, therein the content types comprise printed text content type, handwritten text content type, chop stamp content type, structured content type, barcode content type, and complex content type.

12. The apparatus of claim 10, further comprising a printed text content handler configured to:

extract a region of interest (ROI) containing printed text for each of the content components of printed content type for further processing and disregard empty background space in the logical layer of printed text content type;

depending on a language model chosen for printed text content handler, segment the ROI into one or more of sentences and characters;

feed the ROI as-is or the one or more of sentences and characters to an Optical Character Recognition (OCR) engine for performing a text recognition for the content component of printed text content type;

extract one or more attributes and a location on the electronic document page of the content component of printed text content type, wherein the attributes comprise at least typeface, font size, and color of the text, and author identification.

13. The apparatus of claim 10, further comprising a handwritten text content handler configured to:

extract a ROI containing handwritten text or signature for each of the content components of handwritten text content type for further recognition as handwritten text or signature, and disregard empty background space in the logical layer of handwritten text content type;

if the ROI contains handwritten text, feed the ROI as-is to an OCR engine for performing a text recognition for the content component of handwritten text content type; and if the ROI contains signature, feed the ROI as-is to a signature verification engine for performing a signature verification comprising comparing the signature to records of authentic signatures stored in a signature database.

14. The apparatus of claim 10, further comprising a chop stamp content handler configured to:

localize an outline shape of a chop stamp content component in the logical layer of chop stamp content type;

crop an image region of the outline shape of the chop stamp content component to obtain an chop stamp image;

perform a text recognition of the chop stamp image to extract a text from the chop stamp image; and compare and verify the chop stamp image and the extracted text with records of chop stamp images stored in a chop stamp database.

15. The apparatus of claim 10, further comprising a structured content handler configured to:

detect, recognize, and extract one or more structured content components in the logical layer of structured content type using structure and shape analysis; and detect, by the structure and shape analysis, a sub-type of each of the extracted structured content components, wherein the sub-types comprising a table, a list, an underlining, a highlighting, a box, and an artifact of a non-arbitrary shape.

16. The apparatus of claim 10, further comprising a barcode content handler configured to:

detect, recognize, and extract one or more barcode content components in the logical layer of barcode content type; and decode each of the extracted barcode content components into machine readable data.

17. The apparatus of claim 10, further comprising a complex content handler configured to:

detect, recognize, and extract one or more complex content components in the logical layer of complex content type;

detect a sub-type of each of the extracted complex content components; and invoke a context-sensitive content handling sub-module for each of the extracted complex content component according to its complex content sub-type.

18. The apparatus of claim 10, further comprising a multi-layer cross-referencing handler configured to:

perform context-sensitive cross referencing of two or more content components extracted from logical layers of different content types, comprising:

analyzing locations, content types, sub-types, and attributes of the content components to be cross-referenced to determine the relationship between the content components; and determining a context significance from the determined relationship.

\* \* \* \* \*